United States Patent [19]
Mark

[11] 4,277,597
[45] Jul. 7, 1981

[54] PROCESS FOR PREPARING POLYCARBONATES USING STERICALLY HINDERED HETEROCYCLOALIPHATIC SECONDARY AMINE CATALYSTS

[75] Inventor: Victor Mark, Evansville, Ind.

[73] Assignee: General Electric Company, Mt. Vernon, Ind.

[21] Appl. No.: 107,722

[22] Filed: Dec. 28, 1979

[51] Int. Cl.³ .............................................. C08G 63/62
[52] U.S. Cl. ................................... 528/199; 528/126; 528/175; 528/182; 528/198
[58] Field of Search ............... 528/199, 198, 126, 175, 528/182

[56] References Cited
U.S. PATENT DOCUMENTS
3,763,099  10/1973  Jaquiss ................................. 528/199

*Primary Examiner*—Harold D. Anderson
*Attorney, Agent, or Firm*—Martin B. Barancik; William F. Mufatti

[57] ABSTRACT

An interfacial polymerization process for preparing high molecular weight polycarbonates by reacting a dihydric phenol with a carbonate precursor in the presence of a catalytic amount of a sterically hindered heterocycloaliphatic secondary amine or a salt thereof.

7 Claims, No Drawings

PROCESS FOR PREPARING POLYCARBONATES USING STERICALLY HINDERED HETEROCYCLOALIPHATIC SECONDARY AMINE CATALYSTS

This invention is directed to an interfacial polymerization process for preparing high molecular weight aromatic polycarbonates which comprises reacting under interfacial polycarbonate-forming conditions a dihydric phenol and a carbonate precursor in the presence of a catalytic amount of a sterically hindered heterocycloaliphatic secondary amine or a salt thereof.

BACKGROUND OF THE INVENTION

Polycarbonates are well known thermoplastic materials finding a wide range of uses, particularly for injection molding applications and as glazing sheet for replacement of window glass. The interfacial polymerization technique, which is one of the methods employed in preparing a polycarbonate, involves reacting a dihydric phenol and a carbonate precursor in the presence of an aqueous caustic solution containing an alkali or alkaline earth metal hydroxide, and in inert organic solvent medium which is a solvent for the polycarbonate as it is formed. While the interfacial polymerization process is generally effective in producing polycarbonates, it does, in general, suffer from two disadvantages. Firstly, the rate of reaction is relatively slow. Secondly, there is a general difficulty in producing high molecular weight aromatic polycarbonates, i.e., those having a weight average molecular weight of about 15,000 to greater. Many techniques, such as those employing ultrasonic waves during the reaction, have been employed to remedy these two disadvantages. These techniques have not always proved to be entirely effective and involve the use of cumbersome and expensive equipment. It is advantageous economically to speed up the reaction and to produce high molecular weight aromatic polycarbonates without having to employ extra equipment or more severe reaction conditions. One such method is the use of catalysts in the interfacial polymerization process.

However, there is generally relatively little known about effective catalysis of polycarbonate reactions. The prior art discloses that certain compounds such as tertiary and quaternary amines and their salts (U.S. Pat. No. 3,275,601), guanidine compounds (U.S. Pat. No. 3,763,099), and ammonia and ammonium compounds (U.S. Pat. No. 4,055,544) are effective catalysts for the interfacial polymerization process for producing polycarbonates. However, the prior art also teaches that certain organic nitrogen compounds function as molecular weight regulators or chain terminators in the polycarbonate reactions. Thus, the afore-mentioned U.S. Pat. No. 3,275,601 discloses that aniline and methyl aniline function as chain terminators in the polycarbonate reaction, while U.S. Pat. No. 4,001,184 discloses that primary and secondary amines are effective molecular weight regulators. Furthermore, U.S. Pat. No. 4,111,910 teaches that ammonia, ammonium compounds, primary amines, and secondary amines function as chain terminators in the formation of polycarbonates via the interfacial polymerization process, and U.S. Pat. No. 3,223,678 teaches that monoethanolamine and morpholine act to break the polycarbonate chain thereby resulting in lower molecular weight polycarbonates.

DESCRIPTION OF THE INVENTION

This invention is directed to an interfacial polymerization process for producing high molecular weight aromatic carbonate polymers wherein a dihydric phenol is reacted with a carbonate precursor in the presence of an aqueous caustic solution containing an alkali metal or alkaline earth metal hydroxide and a catalyst which is a sterically hindered heterocycloaliphatic secondary amine or a salt of a sterically hindered heterocycloaliphatic secondary amine.

The reaction of a dihydric phenol such as 2,2-bis(4-hydroxyphenyl)propane with a carbonate precursor such as phosgene results in a high molecular weight aromatic polycarbonate polymer consisting of dihydric phenol derived units bonded to one another through carbonate linkages. The reaction is carried out in the presence of an aqueous caustic solution containing the alkali and alkaline earth metal hydroxide as acid acceptors and an inert organic solvent medium which is a solvent for the polycarbonate as it is formed. Generally, a molecular weight regulator is also present to control the molecular weight of the polycarbonate polymer. In the process of the present invention, a sterically hindered heterocycloaliphatic secondary amine or its salt is present and acts as an effective catalyst to speed up the reaction between the carbonate precursor and the dihydric phenol.

The high molecular weight aromatic carbonate polymers produced in accordance with the practice of this invention include carbonate homopolymers of dihydric phenols or carbonate copolymers of two or more different dihydric phenols. Additionally, the production of high molecular weight thermoplastic randomly branched polycarbonate and copolyester-polycarbonates are included within the scope of this invention. The randomly branched polycarbonates are prepared by coreacting a polyfunctional organic compound with the afore-described dihydric phenol and carbonate precursor.

The dihydric phenols employed in the practice of this invention are known dihydric phenols in which the sole reactive groups are the two phenolic hydroxyl groups. Some of these are represented by the general formula

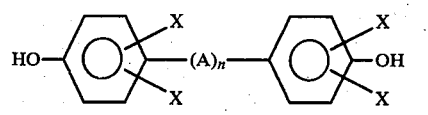

wherein A is a divalent hydrocarbon radical containing 1-15 carbon atoms,

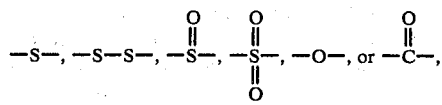

X is independently hydrogen, halogen, or a monovalent hydrocarbon radical such as an alkyl group of 1-4 carbons, an aryl group of 6-10 carbons such as phenyl, tolyl, xylyl, naphthyl, an oxyalkyl group of 1-4 carbons or an oxyaryl group of 6-10 carbons and n is 0 or 1.

Typical of some of the dihydric phenols that can be employed in the practice of the present invention are bisphenols such as bis(4-hydroxyphenol)methane, 2,2-bis(4-hydroxyphenol)propane (also known as bisphenol-A), 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, etc., dihydric phenol ethers such as bis(4-hydroxyphenyl)ether, bis(3,5-dichloro-4-hydroxyphenyl)ether, etc.; dihydroxydiphenyls such as p,p'-dihydroxydiphenyl, 3,3'-dichloro-4,4'-dihydroxydiphenyl, etc.; dihydroxyaryl sulfones such as bis(4-hydroxyphenyl) sulfone, bis(3,5-dimethyl-4-hydroxyphenyl)sulfone, etc., dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene, etc., and dihydroxy diphenyl sulfides and sulfoxides such as bis(4-hydroxyphenyl) sulfide and bis(4-hydroxyphenyl) sulfoxide, bis-(3,5-dibromo-4-hydroxyphenyl) sulfoxide, etc. A variety of additional dihydric phenols are also available and are disclosed in U.S. Pat. Nos. 2,999,835; 3,028,365 and 3,153,008, all of which are incorporated herein by reference. It is, of course, possible to employ two or more different dihydric phenols or a copolymer of a dihydric phenol with glycol or with hydroxy or acid terminated polyester, or with a dibasic acid in the event a polycarbonate copolymer or interpolymer rather than a homopolymer is desired for use in the preparation of the polycarbonate polymers of this invention. Also employed in the practice of this invention are blends of any of the above dihydric phenols, the preferred dihydric phenol is bisphenol-A. The polyfunctional organic compounds which may be included within the scope of this invention are set forth in U.S. Pat. Nos. 3,635,895 and 4,001,184, which are incorporated herein by reference. These polyfunctional aromatic compounds contain at least three functional groups which are carboxyl, carboxylic anhydride, haloformyl or mixtures thereof. Examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride or trimellitic acid or their haloformyl derivatives. Also included herein are blends of a linear polycarbonate and a branched polycarbonate.

The carbonate precursor can be either a carbonyl halide or a bishaloformate. The carbonyl halides include carbonyl bromide, carbonyl chloride, and mixtures thereof. The bishaloformates suitable for use include the bishaloformates of dihydric phenols such as bischloroformates of 2,2-bis(4-hydroxyphenol)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

By adding monofunctional compounds which are capable of reacting with phosgene or with the end groups of the polycarbonates consisting of the chlorocarbonic acid ester group and which terminate the chains, such as the phenols, e.g., phenol, tertbutylphenyl, cyclohexylphenol, and 2,2-(4,4-hydroxyphenylene-4'-methoxyphenylene)-propane, aniline and methylaniline, it is possible to regulate the molecular weight of the polycarbonates.

As mentioned hereinabove, the acid acceptor is an alkali or alkaline earth metal hydroxide. Illustrative of these acid acceptors are sodium hydroxide, lithium hydroxide, potassium hydroxide, calcium hydroxide and the like. The amount of said acid acceptor present should be sufficient to maintain the pH of the aqueous caustic solution above about 9.

Illustrative of the inert organic solvents which are present during the reaction and which dissolve the polycarbonate as it is formed are aromatic hydrocarbons and halogenated hydrocarbons such as benzene, toluene, xylene, chlorobenzene, orthodichlorobenzene, chloroform, methylene chloride, carbon tetrachloride, trichloroethylene and dichloroethane. The solvent is present in an amount effective to solubilize or dissolve substantially all of the polycarbonate as it is formed.

The catalytic compounds within the scope of the instant invention are the sterically hindered heterocycloaliphatic secondary amines and their salts. The sterically hindered heterocycloaliphatic secondary amines are represented by the general formula

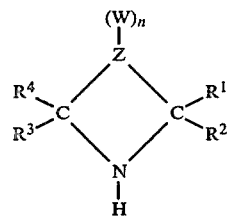

wherein $R^1$, $R^2$, $R^3$ and $R^4$ are independently selected from hydrogen, alkyl, substituted alkyl, alkenyl, cycloalkyl, substituted cycloalkyl, aryl, substituted aryl, aralkyl and alkaryl radicals, with the proviso that not more than 2 of $R^1$–$R^4$ can be hydrogen; Z represents a divalent organic radical completing a 4 to 8 membered heterocycloaliphatic ring, more particularly Z represents a divalent organic radical containing from (1 to 5)-X carbon atoms and 0 to 1 atoms selected from the group consisting of oxygen, nitrogen and sulfur atoms, wherein X is 0 if Z contains only carbon atoms and 1 if Z contains one atom selected from the group consisting of oxygen, nitrogen, and sulfur atoms, with the proviso that Z contains at least one carbon atom, i.e., Z is a divalent organic radical selected from the group consisting of (i) divalent aliphatic hydrocarbon radicals containing from 1 to 5 carbon atoms, and (ii) a divalent organic radical containing from 1 to 4 carbon atoms and 1 atom selected from the group consisting of oxygen, nitrogen, and sulfur; each W is independently selected from hydroxyl, alkoxy, lower alkyl and cycloalkyl radicals; and n is an integer having a value from 0 to a maximum value equal to the number of replaceable hydrogens present in Z.

Illustrative divalent radicals represented by Z are set forth in TABLE I.

TABLE I

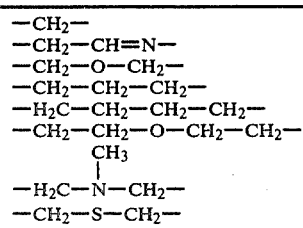

TABLE I-continued

—CH$_2$—CH$_2$—,
—CH=CH—

Preferred compounds of formula I are those wherein R$^1$, R$^2$, R$^3$ and R$^4$ are independently selected from alkyl, substituted alkyl, alkenyl, substituted alkenyl, cycloalkyl, substituted cycloalkyl, aryl, substituted aryl, aralkyl, and alkaryl radicals.

Preferred alkyl radicals represented by R$^1$-R$^4$ are those containing from 1 to about 20 carbon atoms. Illustrative of these preferred alkyl groups are methyl, ethyl, n-propyl, isopropyl, n-butyl, isobutyl, sec-butyl, tert-butyl, n-pentyl and the various positional isomers thereof, and likewise the straight and branched chain positional isomers of hexyl heptyl, octyl, nonyl, decyl and the like.

Preferred substituted alkyl radicals represented by R$^1$-R$^4$ are those containing from 1 to about 14 carbon atoms and from 1 to about 3 substituent groups independently selected from hydroxyl and alkoxy radicals.

Preferred alkenyl radicals represented by R$^1$-R$^4$ are those containing from 2 to about 20 carbon atoms. Illustrative preferred alkenyl radicals include vinyl, propenyl, allyl, butenyl, methallyl, w-methylpropenyl, 3-octenyl, and the like.

Preferred substituted alkenyl radicals represented by R$^1$-R$^4$ are those containing from 2 to about 14 carbon atoms and from 1 to about 3 substituent groups independently selected from lower alkyl, hydroxyl, and alkoxy radicals.

Preferred cycloalkyl radicals represented by R$^1$-R$^4$ are those containing from 3 to about 14 carbon atoms. Illustrative of these cycloalkyl radicals are cyclopropyl, cyclobutyl, cyclopentyl, cyclohexyl, cycloheptyl, cyclooctyl, cyclononyl, dimethylcyclohexyl, propylcyclohexyl, and the like.

Preferred substituted cycloalkyl radicals represented by R$^1$-R$^4$ are those containing from 3 to 14 carbon atoms and from 1 to about 3 substituent groups independently selected from alkyl, hydroxyl, and alkoxy radicals. Illustrative of these substituted cycloalkyls are 3-methylcyclopentyl, 4,4-dimethylcyclohexyl, methoxycyclopropyl, and the like.

Preferred aryl groups represented by R$^1$-R$^4$ are phenyl and naphthyl, while preferred alkaryl radicals represented by R-R$^7$ are those containing from 7 to about 14 carbon atoms. Illustrative of these preferred alkaryl groups are tolyl, 2,6-xylyl, 2,4-xylyl, p-ethylphenyl, 2-methyl-1-naphthyl, 1-ethyl-2-naphthyl, and the like. Preferred substituted aryl groups are those containing from 1 to 3 substituent groups independently selected from alkyl, hydroxyl and alkoxy radicals.

Preferred aralkyl radicals represented by R$^1$-R$^4$ are those containing from 7 to about 14 carbon atoms. Illustrative of these aralkyl radicals are benzyl, phenylethyl, phenylpropyl, cumyl, phenylbutyl, naphthylmethyl, and the like.

Illustrative preferred sterically hindered heterocycloaliphatic secondary amines represented by Formula I are set forth in TABLE II.

TABLE II

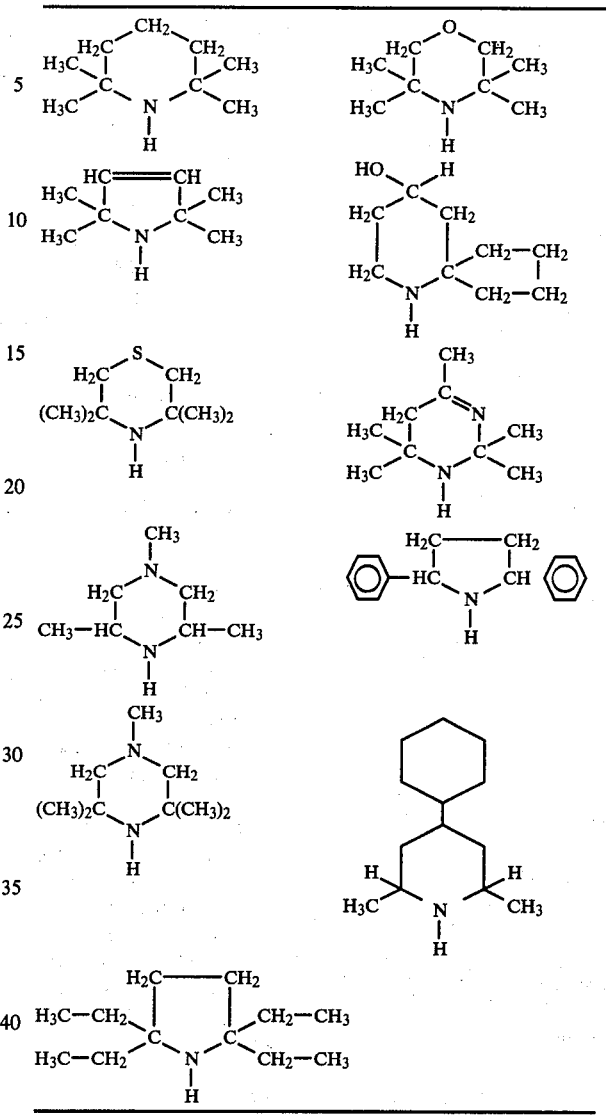

The salts of the sterically hindered heterocycloaliphatic secondary amines are represented by the general formula

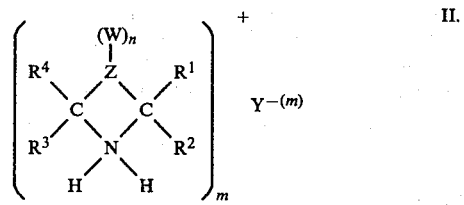

wherein R$^1$, R$^2$, R$^3$, R$^4$, W and n are as defined above, Y is a m valent anion, preferably one selected from the group consisting of halides, sulfate, sulfite, phosphate, phosphite, carbonate, nitrate, nitrite, and carboxylate, and m is an integer having a value from 1 to 3 inclusive.

Preferred salts of formula II. are those wherein R$^1$, R$^2$, R$^3$ and R$^4$ are independently selected from alkyl, substituted alkyl, alkenyl, substituted alkenyl, cycloalkyl, substituted cycloalkyl, aryl, substituted aryl, aralkyl, and alkaryl radicals.

Illustrative preferred salts of sterically hindered heterocycloaliphatic secondary amines are set forth in TABLE III.

TABLE III

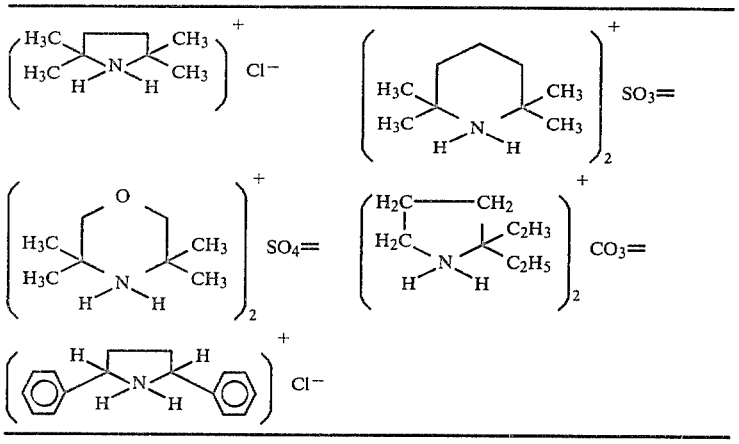

The sterically hindered heterocycloaliphatic secondary amines used as catalysts in the process of the instant invention are known compounds whose chemistry and preparation are well known to those skilled in the art. These compounds, and their preparation, are discussed in *Open-Chain Nitrogen Compounds*, by P. A. S. Smith, W. A. Benjamin Inc. 1956, New York, N.Y., pp. 60–83.

The amount of the catalyst present during the reaction is a catalytic amount. By catalytic amount is meant an amount effective to catalyze the reaction between the dihydric phenol and the carbonate precursor to produce the polycarbonate. Generally, this amount ranges from about 0.01 to about 10 weight percent based on the weight of the dihydric phenol present.

The present process is carried out by reacting the dihydric phenol, such as bisphenol-A, with a carbonate precursor, such as phosgene, in a reaction medium consisting of an aqueous caustic solution and an inert organic solvent for the polycarbonate and in the presence of a catalytic amount of the sterically hindered heterocycloaliphatic secondary amine or sterically hindered heterocycloaliphatic secondary amine salt catalyst.

The temperature at which this reaction proceeds may vary from below 0° C. to about 100° C. The reaction proceeds satisfactorily at temperatures ranging from about room temperature to about 50° C. Since the reaction is exothermic, the rate of carbonate precursor addition may be used to control the reaction temperature. The amount of carbonate precursor, such as phosgene, required will generally depend upon the amount of dihydric phenol present. Generally, one mole of the carbonate precursor will react with one mole of dihydric phenol to provide the polycarbonate. When a carbonyl halide, such as phosgene, is used as the carbonate precursor, two moles of hydrohalic acid such as HCl are produced by the above reaction. These two moles of acid are neutralized by the alkali and alkaline earth metal hydroxide acid acceptor present. The foregoing are herein referred to as stoichiometric or theoretical amounts.

PREFERRED EMBODIMENT OF THE INVENTION

In order to more fully and clearly illustrate the present invention, the following examples are presented. It is intended that the examples be considered as illustrative rather than limiting the invention disclosed and claimed herein. In the examples, all parts and percentages are on a weight basis unless otherwise specified.

EXAMPLE 1

This example illustrates an unsuccessful attempt to prepare a polycarbonate polymer via the interfacial polymerization technique without the presence of a catalyst. To a reactor fitted with a reflux condenser and a mechanical agitator, charge 57 parts of 2,2-bis(4-hydroxyphenol)propane, 57 parts of water, 325 parts of methylene chloride, and 1.2 parts of para-tertiarybutylphenol. Phosgene is then added to the reaction mixture at a rate of 0.65 parts per minute for a period of 30 minutes while maintaining the pH at 9 by the addition of a 15% aqueous sodium hydroxide solution. After 30 minutes, the pH is raised to 11.0 by the use of additional amounts of sodium hydroxide solution. Phosgenation is continued for a further 10 minutes at this pH. The material is recovered from the reaction and found to have an intrinsic viscosity of 0.12 dl/g. This indicates that no practical degree of polymerization is achieved.

EXAMPLE 2

To a reactor filled with a reflux condenser and a mechanical agitator, charge 75.2 grams of 2,2-bis(4-hydroxyphenyl)propane, 300 ml of methylene chloride, 200 ml of water and 1 gram of 2,2,6,6-tetramethylpiperidine. Phosgene is then added to the reaction mixture at the rate of 0.9 grams per minute for a period of 30 minutes while maintaining the pH at 9 by the addition of a 25% aqueous solution of sodium hydroxide. After the 30 minute period, the pH is raised to 11.0 by the use of additional amounts of sodium hydroxide solution. Phosgenation is continued for an additional 10 minutes at this pH, followed for an additional 7 minutes at pH 13.

The polycarbonate is recovered from solution, dried and is found to have an intrinsic viscosity of 0.24 dl/g. This indicates the formation of a high molecular weight aromatic polycarbonate.

EXAMPLE 3

The procedure of Example 2 is substantially repeated, except that 1 gram of 4-hydroxy-2,2,6,6-tetramethylpiperidine is substituted for the 2,2,6,6-tetramethylpiperidine. The polycarbonate is recovered and is found to have an intrinsic viscosity of 0.196 dl/g. This indicates the formation of a relatively high molecular weight aromatic polycarbonate.

EXAMPLE 4

The procedure of Example 2 is substantially repeated, except that 1.0 gram of 2,2,5,5-tetramethylpyrrolidine is substituted for the 2,2,6,6-tetramethylpiperidine. The polycarbonate is recovered and is found to have an intrinsic viscosity of 0.32 dl/g. This indicates the formation of a relatively high molecular weight aromatic polycarbonate.

EXAMPLE 5

The procedure of Example 1 is substantially repeated, except that para-tertiarybutylphenol is replaced with 0.47 grams of phenol and the phosgenation is carried out in the presence of 0.71 grams of 2,2,6,6-tetramethylpiperidine. The polycarbonate is recovered and is found to have an intrinsic viscosity of 0.39 dl/g. This indicates the formation of a high molecular weight aromatic polycarbonate.

EXAMPLE 6

The procedure of Example 2 is substantially repeated, except that 1.5 grams of 2,2,4,4,6-pentamethyl-2,3,4,5-tetrahydropyrimidine is substituted for 2,2,6,6-tetramethylpiperidine. The polycarbonate is recovered and is found to have an intrinsic viscosity of 0.23 dl/g. This indicates the formation of a high molecular weight aromatic polycarbonate.

EXAMPLE 7

This Example illustrates the fact that non-sterically hindered heterocycloaliphatic secondary amines are not effective catalysts in the interfacial polymerization process for producing high molecular weight polycarbonates.

The procedure of Example 1 is substantially repeated, except that the phosgenation is carried out in the presence of 0.8 gram of piperidine. The product is recovered and is found to have an intrinsic viscosity of 0.13 dl/g. This indicates that no practical degree of polymerization is achieved.

As can be seen by comparison of Example 1 with Examples 2-6, the use of the catalysts of the instant invention results in the production of high molecular weight aromatic polycarbonates via the interfacial polymerization techniques, while in the absence of the catalysts of the instant invention the interfacial polymerization technique is ineffective in producing high molecular weight aromatic polycarbonates. Example 7 clearly shows that a non-sterically hindered heterocycloaliphatic secondary amine falling outside the scope of Formula I is ineffective as a catalyst in the interfacial polymerization technique.

The Examples clearly illustrate that the specific sterically hindered heterocycloaliphatic secondary amines represented by Formula I are effective catalysts in producing high molecular weight aromatic polycarbonates via the interfacial polymerization process.

It will thus be seen that the objects set forth above, among those made apparent from the preceding description, are efficiently attained, and since certain changes may be made in carrying out the above process and the composition set forth without departing from the scope of the invention, it is intended that all matters contained in the above description shall be interpreted as illustrative and not in a limiting sense.

What I claim is:

1. An interfacial polymerization process for preparing high molecular weight polycarbonates which comprise reacting, under interfacial polycarbonate-forming conditions, a dihydric phenol and a carbonate precursor in the presence of a catalytic amount of a compound selected from the group consisting of a secondary amine of the formula

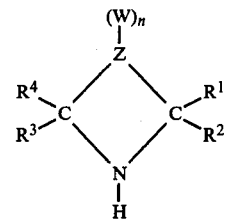

wherein $R^1$, $R^2$, $R^3$ and $R^4$ are independently selected from the group consisting of hydrogen, alkyl, substituted alkyl, alkenyl, substituted alkenyl, cycloalkyl, substituted cycloalkyl, aryl, substituted aryl, alkaryl and aralkyl radicals, with the proviso that not more than 2 of $R^1$-$R^4$ are hydrogen; Z represents a divalent organic radical completing a 4 to 8 membered heterocycloaliphatic ring and containing from (1 to 5)$-$X carbon atoms and 0 to 1 atom selected from the group consisting of oxygen, nitrogen, and sulfur, wherein X is 0 or 1 and represents the number of oxygen, nitrogen or sulfur atoms present in Z, with the proviso that Z contains at least one carbon atom; each W is independently selected from the group consisting of cycloalkyl, hydroxyl, alkoxy and lower alkyl radicals; and n is an integer having a value from 0 to a maximum value equal to the number of replaceable hydrogens present in Z and an acid addition salt of the formula

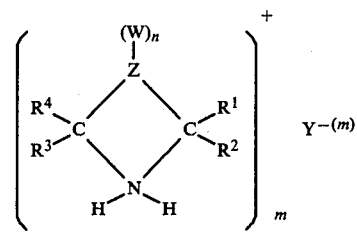

wherein $R^1$, $R^2$, $R^3$, $R^4$, Z and $(W)_n$ are as described above; Y is a m valent anion and m is an integer having a value from 1 to 3 inclusive.

2. The process of claim 1 wherein said catalyst is a free base.

3. The process of claim 2 wherein said dihydric phenol is bisphenol-A and said carbonate precursor is phosgene.

4. The process of claim 3 wherein said catalyst is present in from about 0.01 to about 10 weight percent based on the weight of bisphenol-A.

5. The process of claim 1 wherein said catalyst is an acid addition salt.

6. The process of claim 5 wherein said dihydric phenol is bisphenol-A and said carbonate precursor is phosgene.

7. The process of claim 5 wherein said catalyst is present in an amount of from about 0.01 to about 10 weight percent based on the weight of said bisphenol-A.

* * * * *

UNITED STATES PATENT AND TRADEMARK OFFICE
CERTIFICATE OF CORRECTION

PATENT NO. : 4,277,597

DATED : July 7, 1981

INVENTOR(S) : Victor Mark

It is certified that error appears in the above—identified patent and that said Letters Patent are hereby corrected as shown below:

Column 8, line 32  --  (4-hydroxyphenol)  -- should be  --  (4-hydroxyphenyl)  --

Signed and Sealed this

Ninth Day of February 1982

[SEAL]

Attest:

GERALD J. MOSSINGHOFF

Attesting Officer  Commissioner of Patents and Trademarks